(12) United States Patent
Wessel et al.

(10) Patent No.: US 10,074,386 B1
(45) Date of Patent: Sep. 11, 2018

(54) MAGNETIC WRITER COIL INCORPORATING INTEGRAL COOLING FINS

(71) Applicant: Seagate Technology LLC, Cupertino, CA (US)

(72) Inventors: James Gary Wessel, Savage, MN (US); Raul Horacio Andruet, Woodbury, MN (US)

(73) Assignee: Seagate Technology LLC, Cupertino, CA (US)

( * ) Notice: Subject to any disclaimer, the term of this patent is extended or adjusted under 35 U.S.C. 154(b) by 86 days.

(21) Appl. No.: 15/095,888

(22) Filed: Apr. 11, 2016

Related U.S. Application Data

(60) Provisional application No. 62/163,747, filed on May 19, 2015.

(51) Int. Cl.
| | |
|---|---|
| *G11B 33/14* | (2006.01) |
| *G11B 5/31* | (2006.01) |
| *G11B 5/127* | (2006.01) |
| *G11B 5/48* | (2006.01) |
| *G11B 5/00* | (2006.01) |

(52) U.S. Cl.
CPC .......... *G11B 5/3123* (2013.01); *G11B 5/1278* (2013.01); *G11B 5/4866* (2013.01); *G11B 33/1426* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,452,740 B1 | 9/2002 | Ghoshal | |
| 6,950,280 B2 | 9/2005 | Rea et al. | |
| 7,102,853 B2 | 9/2006 | Macken et al. | |
| 7,391,590 B2 | 6/2008 | Matono et al. | |
| 7,612,965 B2 | 11/2009 | Kurihara et al. | |
| 8,031,432 B2 | 10/2011 | Hsiao et al. | |
| 8,164,855 B1 * | 4/2012 | Gibbons | G11B 5/3116 |
| | | | 360/125.74 |
| 8,286,329 B1 | 10/2012 | Zhao et al. | |
| 8,325,570 B1 | 12/2012 | Tanaka et al. | |
| 8,339,739 B2 | 12/2012 | Balamane et al. | |
| 8,486,286 B1 | 7/2013 | Gao et al. | |
| 8,687,318 B2 | 4/2014 | Meloche et al. | |
| 8,721,902 B1 | 5/2014 | Wang et al. | |
| 9,019,661 B2 | 4/2015 | Rea | |

(Continued)

OTHER PUBLICATIONS

U.S. Appl. No. 15/227,319, filed Aug. 3, 2016, Hutchinson et al.
U.S. Appl. No. 15/344,851, filed Nov. 7, 2016, Wessel et al.

*Primary Examiner* — Brian Butcher
(74) *Attorney, Agent, or Firm* — Hollingsworth Davis, LLC

(57) ABSTRACT

A slider is configured to interact with a magnetic recording medium and comprises an air bearing surface (ABS). A writer is provided on the slider and comprises a write pole terminating at or near the ABS, a return pole proximate the write pole, and a write coil arrangement provide around the write pole. The write coil arrangement comprises lower and upper write coils each having a generally circularly-shaped periphery, and a plurality of spaced-apart cooling fins connected to and projecting outwardly from the periphery of each of the lower and upper write coils.

20 Claims, 12 Drawing Sheets

(56) References Cited

U.S. PATENT DOCUMENTS

| | | | |
|---|---|---|---|
| 9,196,269 B2 | 11/2015 | Cao et al. | |
| 9,251,830 B1 | 2/2016 | Duda et al. | |
| 2008/0019041 A1* | 1/2008 | Aoki | G11B 5/314 |
| | | | 360/110 |
| 2008/0055784 A1 | 3/2008 | Shimazawa et al. | |
| 2008/0170319 A1 | 7/2008 | Seigler et al. | |
| 2008/0253025 A1 | 10/2008 | Fu et al. | |
| 2009/0034121 A1* | 2/2009 | Ohta | G11B 5/3123 |
| | | | 360/125.02 |
| 2009/0052078 A1 | 2/2009 | Tanaka et al. | |
| 2011/0205860 A1 | 8/2011 | Chou et al. | |
| 2011/0216634 A1 | 9/2011 | Chou et al. | |
| 2011/0228419 A1 | 9/2011 | Tanaka et al. | |
| 2011/0228420 A1 | 9/2011 | Hara et al. | |
| 2011/0286128 A1 | 11/2011 | Tsutsumi et al. | |
| 2011/0317528 A1 | 12/2011 | Miyauchi et al. | |
| 2012/0008233 A1 | 1/2012 | Hirano et al. | |
| 2012/0075965 A1 | 3/2012 | Tanaka et al. | |
| 2012/0099407 A1 | 4/2012 | Hipwell et al. | |
| 2012/0113770 A1 | 5/2012 | Stipe | |
| 2013/0091695 A1 | 4/2013 | Shimazawa et al. | |
| 2013/0229730 A1 | 9/2013 | Hirata et al. | |

* cited by examiner

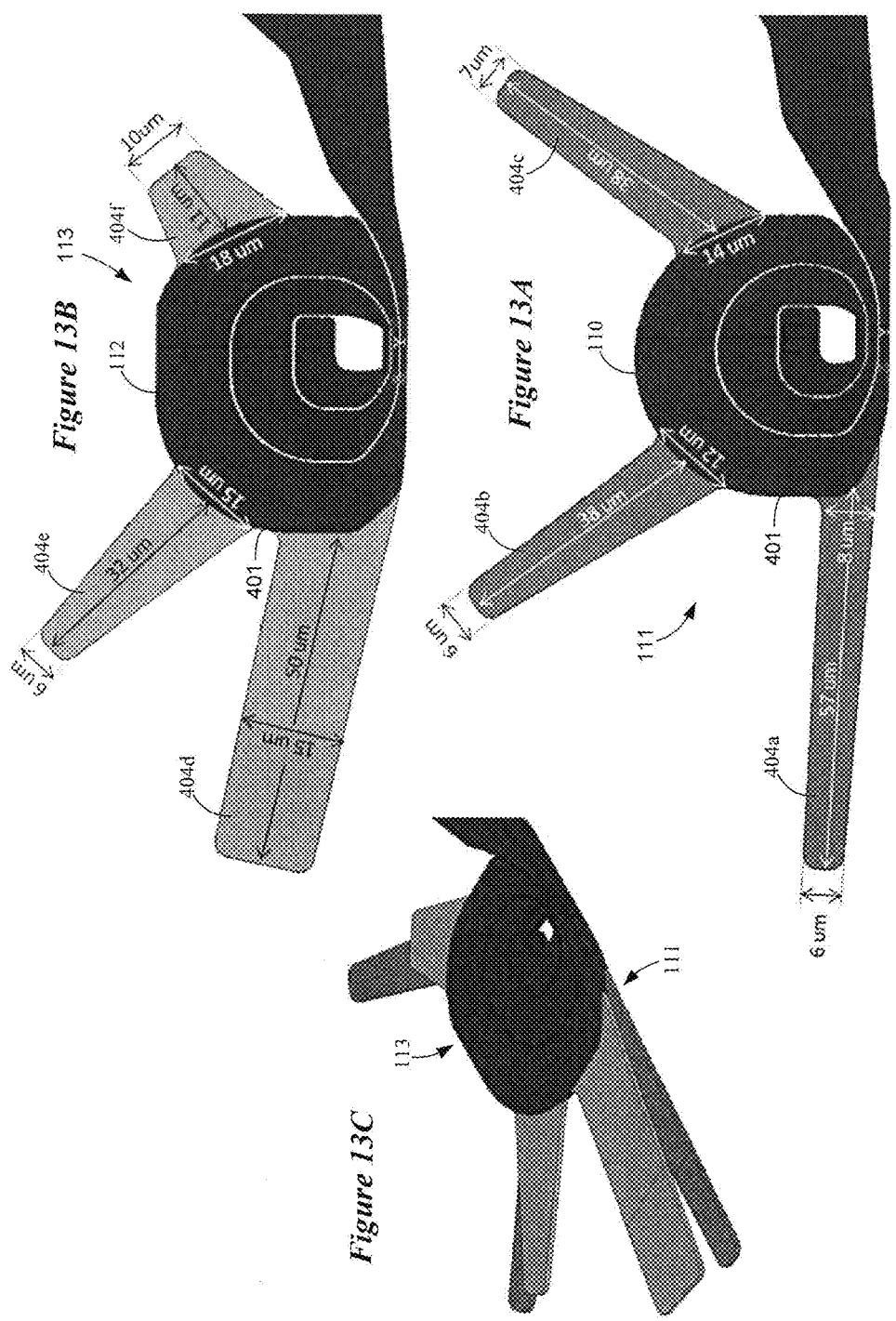

US 10,074,386 B1

MAGNETIC WRITER COIL INCORPORATING INTEGRAL COOLING FINS

RELATED PATENT DOCUMENTS

This application claims the benefit of Provisional Patent Application Ser. No. 62/163,747 filed on May 19, 2015, to which priority is claimed pursuant to 35 U.S.C. § 119(e), and which is incorporated herein by reference in its entirety.

SUMMARY

Embodiments are directed to an apparatus comprising a slider configured to interact with a magnetic recording medium and comprising an air bearing surface (ABS). A writer is provided on the slider and comprises a write pole terminating at or near the ABS, a return pole proximate the write pole, and a write coil arrangement provide around the write pole. The write coil arrangement comprises lower and upper write coils each having a generally circularly-shaped periphery, and a plurality of spaced-apart cooling fins connected to and projecting outwardly from the periphery of each of the lower and upper write coils.

Other embodiments are directed to an apparatus a slider configured to interact with a magnetic recording medium, the slider comprising an air bearing surface (ABS) and a plurality of thermally conductive structures. A writer is provided on the slider and comprises a write pole terminating at or near the ABS, a return pole proximate the write pole, and a write coil arrangement provide around the write pole. The write coil arrangement comprises lower and upper write coils each having a generally circularly-shaped periphery, and a plurality of spaced-apart cooling fins connected to and projecting outwardly from the periphery of each of the lower and upper write coils. At least some of the plurality of cooling fins are thermally coupled to the thermally conductive structures.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIGS. 13A-13C show the lower and upper write coils provided with cooling fins in accordance with embodiments of the disclosure.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
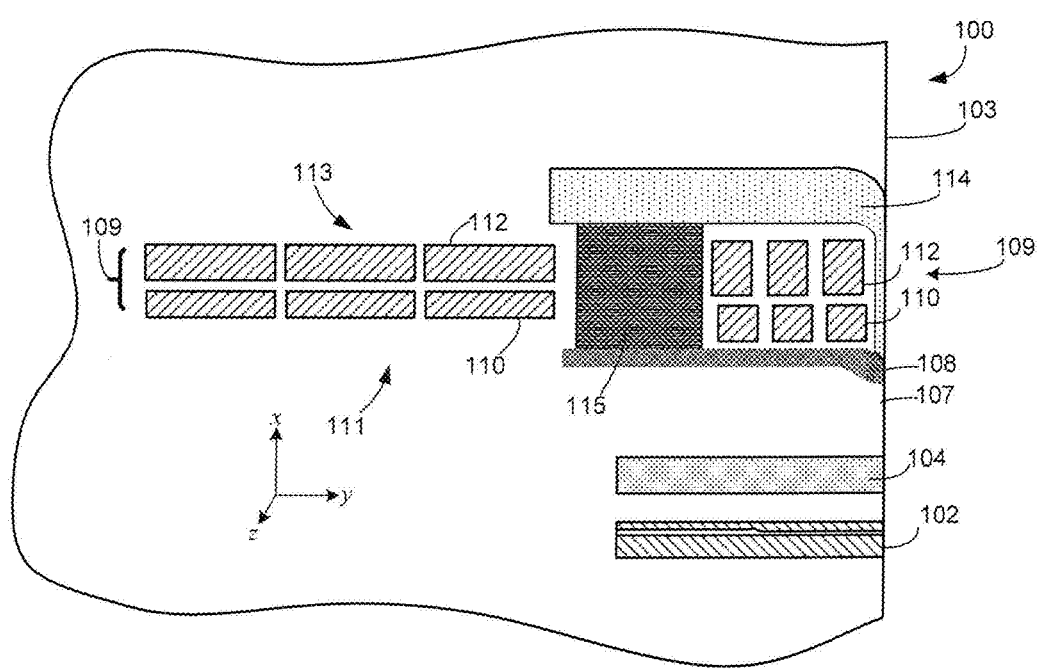
FIG. 1A is a cross-sectional view of a portion of an exemplary slider of a magnetic recording head which includes a double-layer pancake coil design and in which various embodiments of the disclosure can be implemented.

A magnetic recording head of a hard disk drive includes, among various components, a writer comprising a write pole and a return pole that cooperate to magnetically record data onto a magnetic recording medium. In a perpendicular recording system, for example, a highly concentrated magnetic field is emitted from the write pole in a direction perpendicular to the surface of the recording medium, which magnetizes the hard recording layer of the medium. The resulting magnetic flux travels through the soft underlayer of the medium and returns to the return pole. The large surface area of the return pole relative to that of the write pole serves to spread out and weaken the returning magnetic flux as it passes from the soft underlayer and hard recording layer on its way back to the return pole, so as not to erase the signal recorded by the write pole.

During the recording operation, the writer generates heat, which tends to accumulate in and near the coils of the writer. Heating of the writer coils causes undesirable thermal expansion of the writer structures, causing significant protrusion of the writer, referred to as Write Induced Write Protrusion (WIWP). WIWP can result in protrusion of structures of the writer beyond the air beating surface of the slider that supports the writer, which can cause collision between the writer and the surface of the rotating recording medium. Such collisions can cause damage to the writer and possible failure of the hard disk drive.

Undesirable heating of the write coils is exacerbated by additional heat sources associated with a recording head configured for heat assisted magnetic recording (HAMR). HAMR generally refers to the concept of locally heating a magnetic recording medium to reduce coercivity at the heated location. This allows the applied magnetic writing fields to more easily direct the magnetization during the temporary magnetic softening of the medium caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the coercivity is reduced such that the magnetic write field is sufficient to write to the media. Once the media cools to ambient temperature, the coercivity has a sufficiently high value to assure thermal stability of the recorded information.

In order to achieve desired data density, a HAMR recording head includes optical components that direct light from a laser to the recording medium. The HAMR media hotspot must be smaller than a half-wavelength of light available from current sources (e.g., laser diodes). Due to what is known as the diffraction limit, optical components cannot focus the light at this scale. One way to achieve tiny confined hot spots is to use an optical near field transducer (NET), such as a plasmonic optical antenna. The NFT is designed to support local surface-plasmon at a designed light wavelength. At resonance, high electric field surrounds the NFT due to the collective oscillation of electrons in the metal. Part of the field will tunnel into a storage medium and get absorbed, raising the temperature of the medium locally for recording. During recording, a write pole applies a magnetic field to the heated portion of the medium. The heat lowers the magnetic coercivity of the media, allowing the applied field to change the magnetic orientation of heated portion. The magnetic orientation of the heated portion determines whether a one or a zero is recorded. By varying the magnetic field applied to the magnetic recording medium while it is moving, data is encoded onto the medium.

A HAMR drive uses a laser diode to excite the NFT which generates a significant amount of heat during excitation, raising peak temperatures on the order of 200 to 400° C. above ambient, for example. Various thermal management arrangements are used to dissipate heat generated by the NFT, such as a heatsink between the NFT and a return pole of the writer or other adjacent heat reservoir. The writer also dissipates an appreciable amount of power, on the order of about 20 mW to 50 mW, for example. This amount of writer power can raise local temperatures on the order of 100 to 200° C. above ambient. Although present HAMR designs provide heatsinking for the NFT, thermal management of heat produced by the writer has heretofore been largely unaddressed.

Figure 1B:
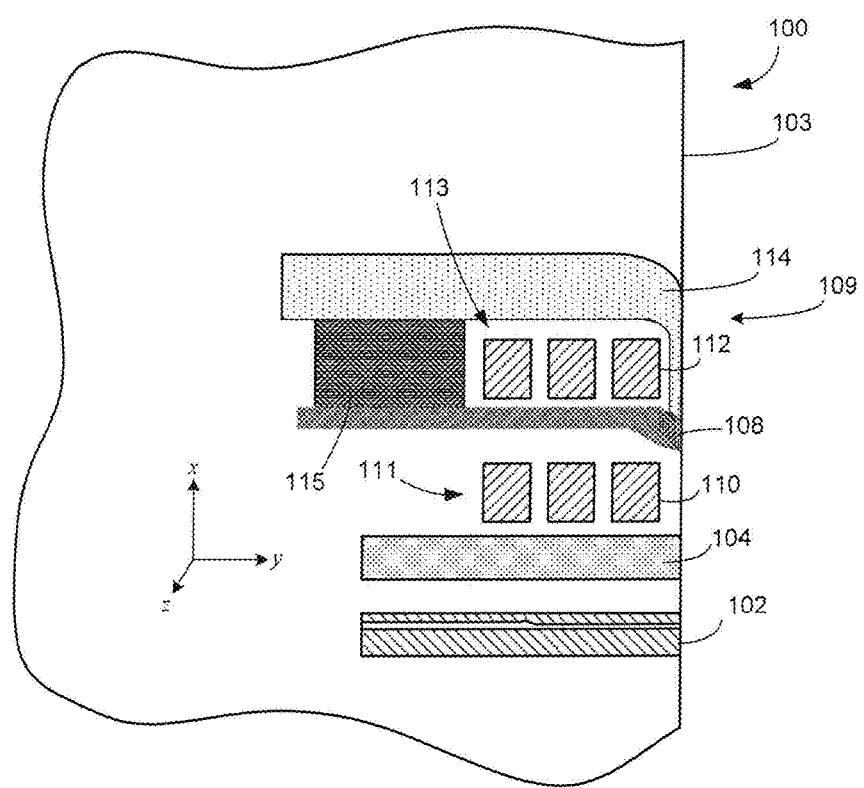
FIG. 1B is a cross-sectional view of a portion of an exemplary slider of a magnetic recording head which includes a helical coil design and in which various embodiments of the disclosure can be implemented.

FIGS. 1A and 1B are cross-sectional views of a portion of an exemplary slider 100 of a magnetic recording head in which various embodiments of the disclosure can be implemented. The slider 100 shown in FIG. 1A includes a writer coil having a double-pancake design, while the slider 100 shown in FIG. 1B includes a writer coil having a helical design. The right edge of the slider 100 shown in FIGS. 1A and 1B represents an air bearing surface (ABS) 103. Within the depicted portion of the slider 100, various components are identified for reference in establishing a position of a write coil cooling fin arrangement according to various embodiments. With reference to the lower region of FIGS. 1A and 1B, a reader 102 is shown proximate a contact pad (and/or alternate flux return path) 104. Proximate the contact pad (and/or alternate flux return path) 104 is a writer 109. The writer 109 is shown to include a write pole 108, a return pole 114, a lower write coil arrangement 111, an upper write coil arrangement 113, and a magnetic via 115.

In the embodiments shown in FIG. 1A, the lower write coil arrangement 111 includes a lower coil 110 and the upper write coil arrangement 113 includes an upper coil 112, both of which are of a double-layer pancake coil design. As will be discussed in detail herein below, each of the lower and upper coil arrangements 111 and 113 include a write coil cooling fin arrangement. It should be noted that, while various embodiments utilize a double-layer pancake coil design (e.g., FIG. 1A), the cooling properties of a write coil cooling fin arrangement may be readily adapted to other coil designs, such as single-layer pancake or helical designs (e.g., FIG. 1B). For example, the configuration of the writer 109 shown in FIG. 1B can be implemented to include either a planar or helical coil design by appropriately shaping the metallic material of the coils 110 and 112. The lower and upper write coil arrangements 111 and 113 shown in FIGS. 1A and 1B are implemented to incorporate an arrangement of integral cooling fins that have been demonstrated to significantly reduce writer coil temperatures, without or only negligibly impacting current flow (e.g., current density) there through.

Figure 2:
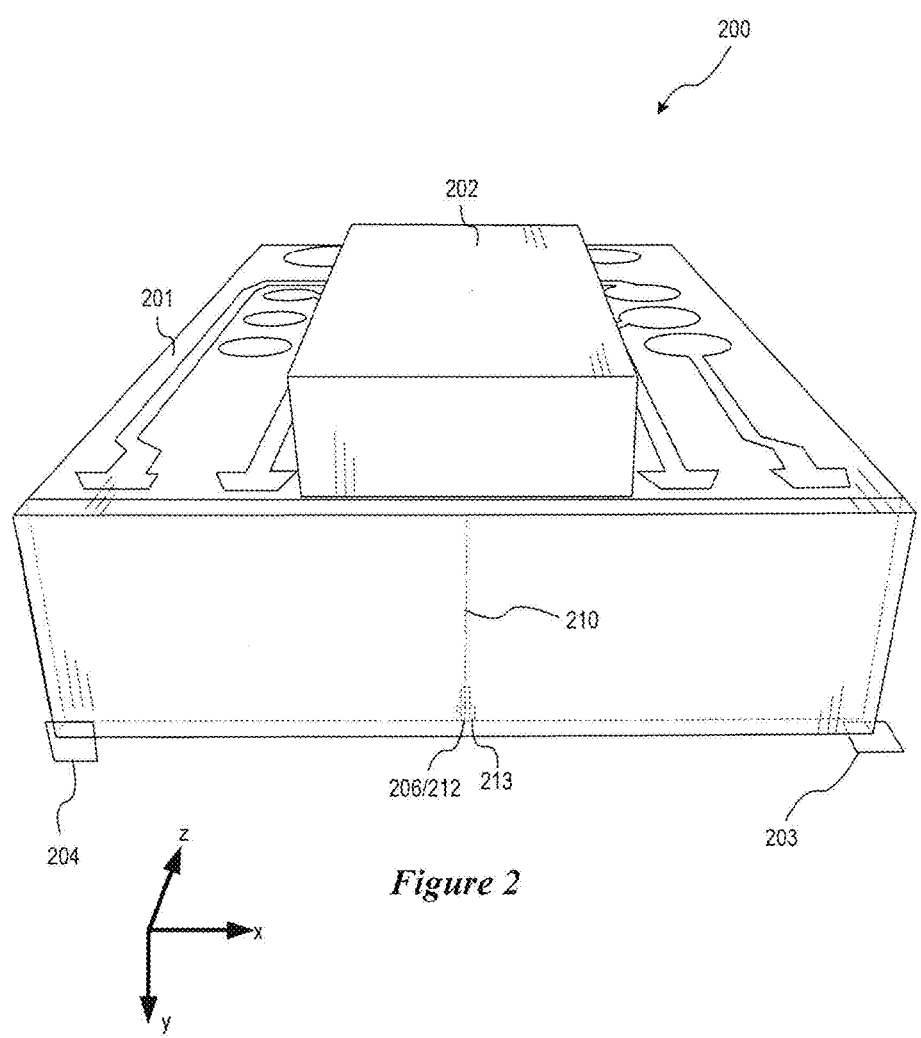
FIG. 2 shows a view of a heat-assisted magnetic recording (HAMR) slider configuration according to representative embodiments of the disclosure.
Figure 3A:
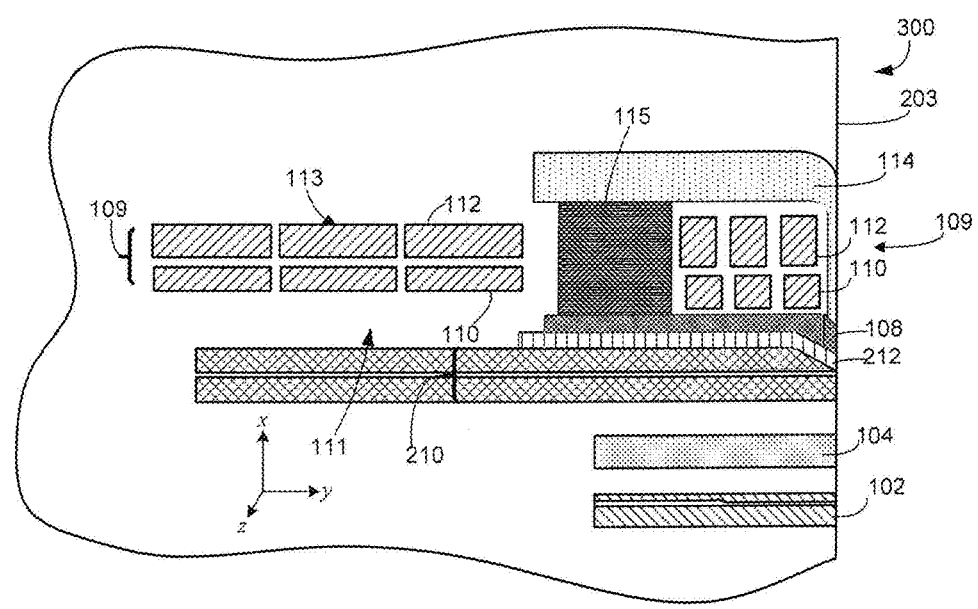
FIG. 3A shows a view of a HAMR slider configuration which includes a double-layer pancake coil design according to representative embodiments of the disclosure.
Figure 3B:
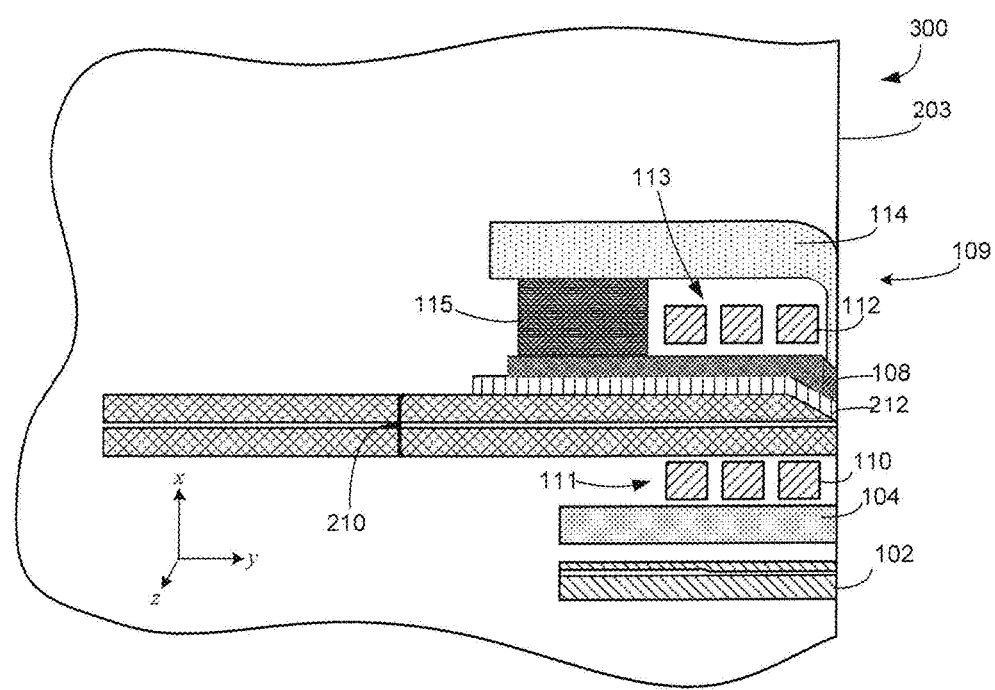
FIG. 3B shows a view of a HAMR slider configuration which includes a helical coil design according to representative embodiments of the disclosure.

FIGS. 2 and 3A-3B show views of HAMR slider configurations according to representative embodiments of the disclosure. With reference to FIG. 2, a perspective view shows a HAMR hard drive slider 200 that may be implemented in accordance with various embodiments of the disclosure. The HAMR slider 200 (also referred to as a read/write head, recording head, read head, write head) utilizes an energy source, which in this example is a laser diode 202 located on top of and proximate to a trailing edge surface 204 of a slider body 201. The laser diode 202 delivers light proximate to a read/write transducer 206, which is proximate an air-bearing surface (ABS) 203 (also referred to as a media-facing surface) of the slider body 201. The media-facing surface 203 is held proximate to a moving magnetic medium surface (not shown) during device operation. The read/write transducer 206 may include, among other things, a magnetoresistive read element (e.g., a reader) and a magnetic write coil that energizes a write pole (e.g., a writer).

The laser diode 202 provides electromagnetic energy to heat the magnetic medium surface as it passes by the read/write transducer 206. Optical coupling components, such as a channel waveguide 210 and a plasmonic near-field transducer (NFT) 212, are formed integrally within the HAMR slider 200 to deliver light from laser diode 202 to a region proximate the read/write transducer 206. The light energizes the NFT 212, which provides local heating of the recording medium during write operations. The laser diode 202 in this example may be an integral, edge-emitting device, although it will be appreciated that the waveguide 210 and NFT 212 may be used with any light source. For example, a surface emitting laser (SEL) may be used instead of an edge-emitting laser, and a laser may be mounted elsewhere, or in different orientation, e.g., on the trailing edge surface 204 of the slider body 201.

While the embodiment illustrated in FIG. 2 shows the laser diode 202 integrated with the HAMR slider 200, the waveguide 210 and NFT 212 discussed herein may be useful in any type of light delivery configuration. For example, in what is referred to as free-space light delivery, a laser may be mounted externally to the slider, and coupled to the slider by way of optic fibers and/or waveguides. The slider 200 in such an arrangement may include a grating coupler into which light is coupled and delivered to a slider-integrated waveguide 210 which energizes NFT 212.

In FIGS. 3A and 3B, a cross-section diagram illustrates features of a HAMR slider 300 according to a representative embodiment of the disclosure. The HAMR slider 300 shown in FIG. 3A includes a writer coil having a double-pancake design, while the HAMR slider 300 shown in FIG. 3B includes a writer coil having a helical design. The cross-section of the slider 300 shown in FIGS. 3A and 3B includes the components of the slider 100 illustrated in FIGS. 1A and 1B, respectively, along with additional optical components. The lower region of FIGS. 3A and 3B shows a reader 102 proximate a contact pad (and/or alternate flux return path) 104. The upper region of FIGS. 3A and 3B shows a writer 109, which includes a write pole 108, a return pole 114, a lower write coil arrangement 111, an upper write coil arrangement 113, and a magnetic via 115. The lower write coil arrangement 111 includes a lower coil 110 and the upper write coil arrangement 113 includes an upper coil 112, both of which are of a double-layer pancake coil design in FIG. 3A, it being understood that the lower and upper coils 110 and 112 can be of a single-layer pancake or helical design (e.g., FIG. 3B) in some embodiments.

The slider 300 also includes an NFT 212 proximate the write pole 108 and a waveguide 210, which may be a channel waveguide or a planar waveguide, for example. Disposed between the NFT 212 and the waveguide 210 is a thin dielectric layer (not shown), which has a refractive index lower than that of the waveguide 210. The waveguide 210 includes a core layer surrounded by cladding layers that are part of a light delivery arrangement that receives light from a source (e.g., laser diode) and directs it to the NFT 212. The materials are selected so that the refractive index of the core layer is higher than refractive indices of the cladding layers. This arrangement of materials facilitates efficient propagation of light through the waveguide's core layer. Optical focusing elements such as mirrors, lenses, etc., may be utilized to concentrate light onto the NFT 212.

During operation, light propagates through the waveguide 210 along the y-direction. Electrical field lines emanate from the waveguide 210 and excite the NFT 212. The NFT 212 delivers surface plasmon-enhanced, near-field electromagnetic energy along the y-direction where it exits at the media-facing surface 203. This results in a highly localized hot spot on the recording medium. The heat lowers magnetic coercivity of the medium, allowing a magnetic flux to change magnetic orientation of the medium near the hotspot without changing magnetic orientation outside of the hotspot. The write pole 108 applies the magnetic flux near the media-facing surface 203 in response to applying a current to coils 110 and 112 which are magnetically coupled to the write pole 108. Because the energy is focused in a relatively small volume of the slider body, significant temperature increases are seen near the NFT 212 and write pole 108 during recording.

Embodiments of the present disclosure are directed to write coil cooling fin arrangements that reduce the temperature of the write coils during write operations. Write coil cooling fin arrangements of the disclosure can be implemented for a variety of write coil designs, including single-layer pancake, double-layer pancake, and helical coil designs. Some embodiments are directed to write coil cooling fin arrangements that thermally couple to thermally conductive structures of the slider to provide for enhanced heat dissipation. In such embodiments, the distal tip of the cooling fin is spaced apart from the thermally conductive structure so that no current flows from the cooling fin to the thermally conductive structure. A thermally conductive dielectric can be disposed between the cooling fin's distal tip and the thermally conductive structure. In some embodiments, the distal tip of the cooling fin includes an enlarged region that has a shape conforming to that of a portion of the periphery of the thermally conductive structure, thereby enhancing heat transfer there between.

Figure 4A:
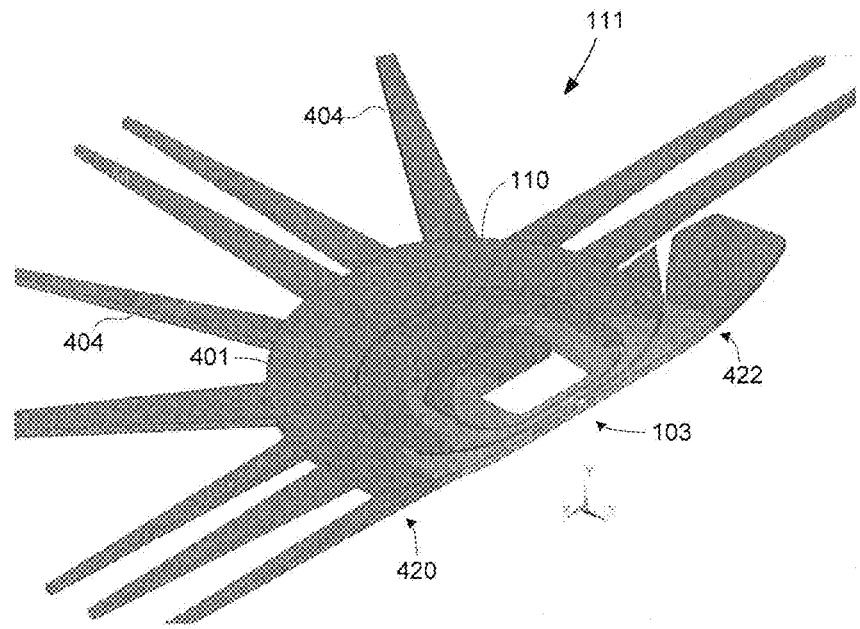
FIGS. 4A and 4B are representative illustrations of write coils that incorporate an integral cooling fin arrangement according to various embodiments of the disclosure.
Figure 4B:
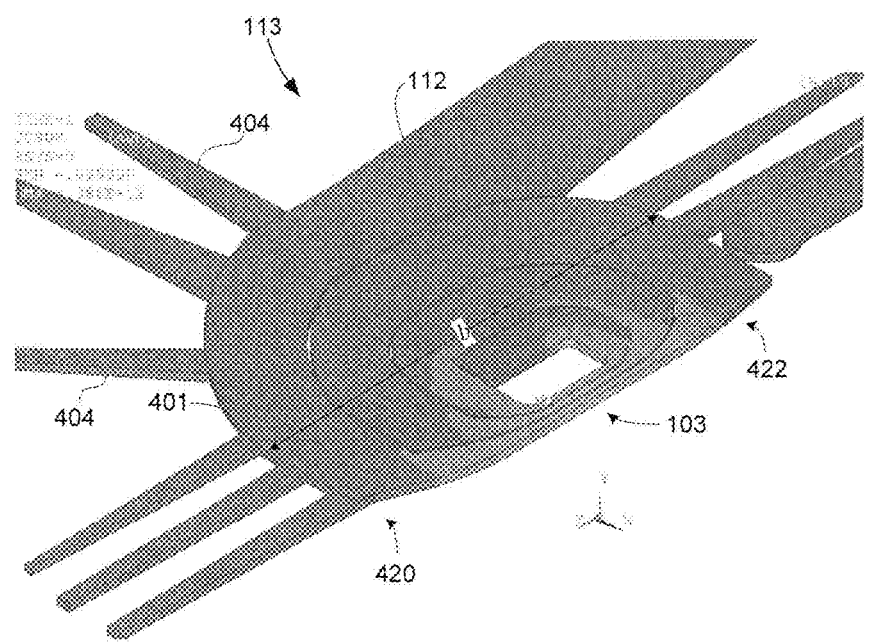

FIGS. 4A and 4B are representative illustrations of write coils that incorporate an integral cooling fin arrangement according to various embodiments of the disclosure. FIG. 4A shows a lower write coil arrangement 111 comprising a planar lower write coil 110 having a generally circularly-shaped periphery 401. FIG. 4B shows an upper write coil arrangement 113 comprising a planar upper write coil 112 having a generally circularly-shaped periphery 401. In the representative illustration of FIGS. 4A and 4B, each of the lower and upper write coils 110 and 112 has 3 coil turns. Each of the lower and upper write coil arrangements 111 and 113 includes a multiplicity of spaced-apart cooling fins 404 connected to and projecting outwardly from the periphery 401 of each of the lower and upper write coils 110 and 112.

The cooling fins 404 are typically formed at the same time and with the same material as their associated lower or upper write coil 110 and 112. As such, the cooling fins 404 can be fabricated using an appropriately designed mask without the need for additional processing steps. In some embodiments, the cooling fins 404 can be formed in a separate processing step(s) using the same or different materials as that used to form the lower or upper write coil 110 and 112. Desirable attributes for coils and fins are generally similar but not identical. For coils, materials with low electrical resistivity, high thermal conductivity, and low thermal expansion are preferred. For cooling fins, high thermal conductivity and low thermal expansion are the most important material properties. Forming the cooling fins 404 in a separate processing step(s) allows the use of different materials for coils and fins, if desired. For example, in some embodiments, the write coils 110/112 and the cooling tins 404 can be formed from Cu, Al, Ag or Au. In embodiments that utilize different materials, the write coils 110 and 112 can be formed from Cu, Al, Ag or Au, and the cooling tins 404 can be formed from W, Cu or Al. Tungsten, for example, has substantially higher electrical resistivity than Cu, Al, Ag, and Au so is undesirable as a coil material. However, W may be an advantageous fin material due to its relatively lower thermal expansion.

As can be seen in FIGS. 4A and 4B, the periphery 401 of each of the lower and upper write coil 110 and 112 defines an arc originating at a first location 420 of the ABS 103 and terminating at a second location 422 of the ABS 103. The arc extends substantially along the periphery 401 of the planer lower and upper write coils 110 and 112. The cooling fins 404 are distributed along the entirety or nearly the entirety of the arc according to the embodiments illustrated in FIGS. 4A and 4B. In other embodiments, the cooling fins 404 can be distributed along a portion (i.e., less than the entirety) of the arc.

Figure 4C:
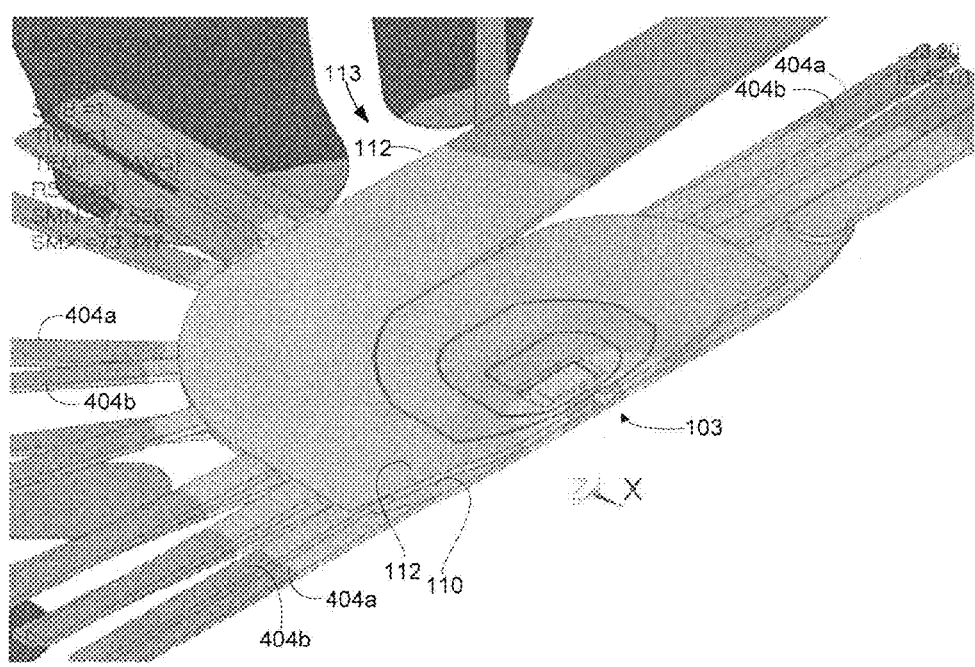
FIG. 4C shows a double-layer pancake coil arrangement with radially staggered integral cooling fins according to various embodiments of the disclosure.

The number of cooling fins 404 projecting from the lower and upper write coils 110 and 112 can be the same or different. The radial location at which the cooling fins 404 project from the lower and upper write coils 110 and 112 can be the same or different. Cooling fins 404 can project substantially perpendicularly from the periphery of the write coils 110 and 112 or obliquely. It has been found, however, that radially staggering the cooling fins 404 of the lower and upper write coils 110 and 112 serves to enhance heat dissipation and to reduce or prevent undesirable capacitive coupling between the cooling fins 404 of the lower and upper write coils 110 and 112. FIG. 4C shows an embodiment of a double-layer pancake coil arrangement (upper write coil arrangement 113) with radially staggered integral cooling fins 404. In the embodiment shown in FIG. 4C, the upper write coil 112 is positioned over, and registered with, the lower write coil 110 as would be the case when forming the writer on the slider. It can be seen in FIG. 4C that the cooling fins 404a of the lower write coil 110 are radially offset from similarly positioned (radially) cooling fins 404b of the upper write coil 112.

Figure 5:
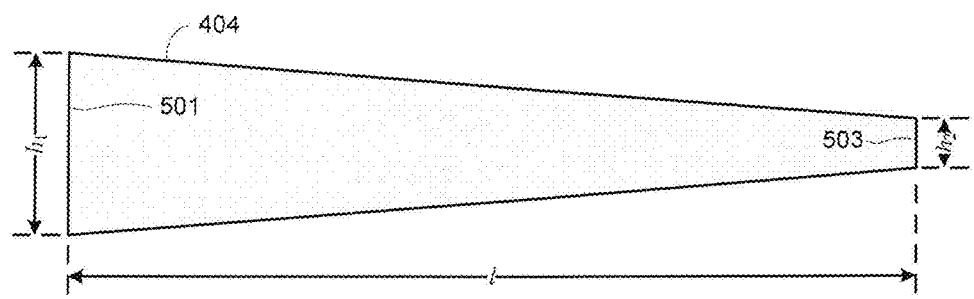
FIG. 5 is a top view of one of the cooling fins shown in FIGS. 4A and 4B.

FIG. 5 is a top view of one of the cooling fins 404 shown in FIGS. 4A-4C. The cooling fin 404 illustrated in FIG. 5 has a generally trapezoidal shape that extends along a longitudinal axis between a proximal end 501 and a distal tip or terminal end 503. The proximal end 501 connects with or abuts the periphery 401 of the write coil 110 or 112, and has a height, $h_1$, that is greater than that ($h_2$) of the distal tip 503. The surface area of the tapered cooling fin 404 reduces as a function of length, l. The length, l, and degree of cooling fin tapering can be optimized to dissipate write coil heat for a given slider design. Although the cooling tins 404 shown in the figures have a trapezoidal shape, it is understood that other shapes are contemplated, including other geometric and curved (or mixed) shapes. Also, different cooling fins 404 can have different shapes and sizes, such that the shape and/or size of the cooling fins 404 for a particular write coil arrangement need not be uniform (but can be uniform if desired).

In some embodiments, the cooling fins 404 can have a length along a longitudinal axis ranging between about 10 and 100 µm. Typically, the cooling fins 404 can have different lengths, although sonic may have the same length. In other embodiments, the cooling fins 404 can have a length along the longitudinal axis ranging between about 50 and 80 µm. In further embodiments, the cooling fins 404 can have a length along the longitudinal axis ranging between about 10 and 60 µm, with at least some of the cooling fins 404 having different lengths.

Figure 8:
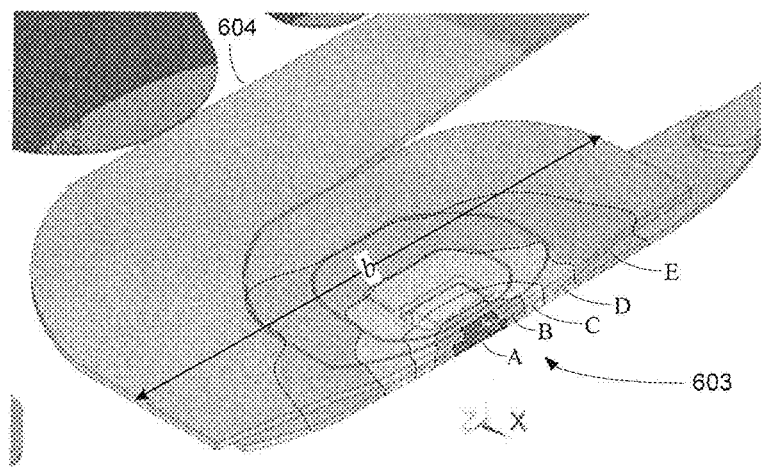
FIG. 8 shows a conventional upper write coil, with temperature contours emanating from the ABS near the center of the write coil for illustrated purposes.
Figure 9:
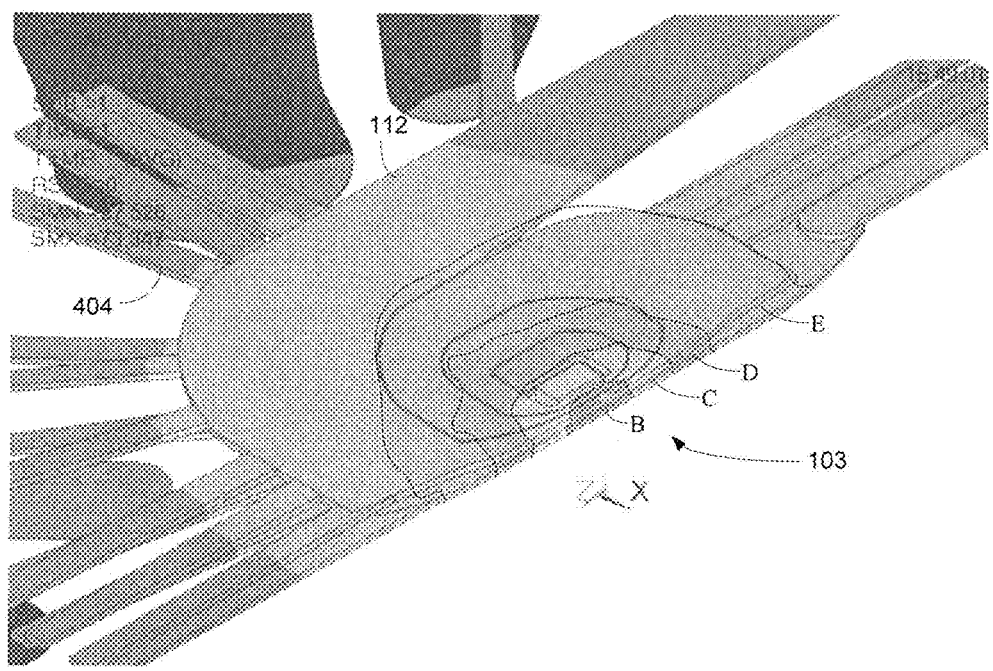
FIG. 9 shows the upper write coil provided with cooling fins in accordance with embodiments of the disclosure, with temperature contours emanating from the ABS near the center of the write coil.

The proximal end 501 of the cooling fin 404 can have a height, $h_1$, ranging between about 4 and 20 µm, such as between about 8 and 18 µm or between about 5 and 7 µm. The distal end 503 of the cooling fin 404 can have a height, $h_2$, ranging between about 2 and 15 µm, such as between about 6 and 15 µm or between about 3 and 5 µm. It is noted that the lower and upper write coils 110 and 112 shown in FIGS. 4A and 4B have a breadth, b, of about 70 µm, it being understood that the breadth dimension can differ for different write coil designs. For example, the write coils shown in FIGS. 8 and 9 are of a different (larger) design than those of FIGS. 4A and 4B. The write coils shown in FIGS. 8 and 9 have a breadth, b, of about 90 µm, with an outer coil turn being much thicker than that of the write coils shown in FIGS. 4A and 4B.

Figure 6A:
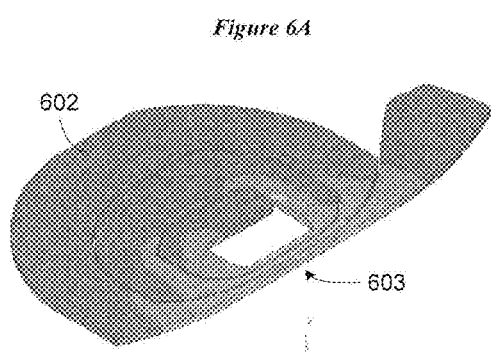
FIGS. 6A and 6B show conventional lower and upper write coils, with current density contours emanating from the ABS near the center of the write coils for illustrated purposes.
Figure 7A:
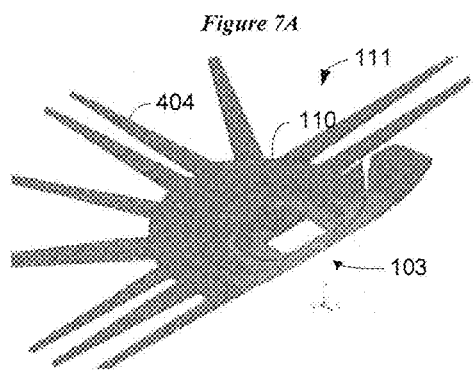
FIGS. 7A and 7B show the lower and upper write coils provided with cooling fins in accordance with embodiments of the disclosure, with current density contours emanating from the ABS near the center of the write coils.
Figure 6B:
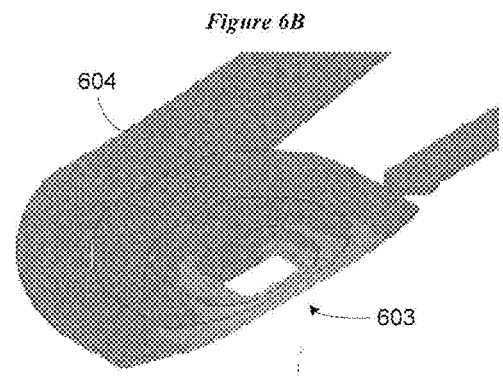
Figure 7B:
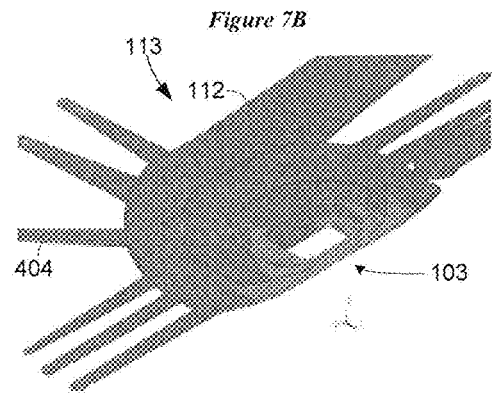

FIGS. 6A and 6B show conventional lower and upper write coils 602 and 604, with current density contours emanating from the ABS 603 near the center of the write coils 602 and 604. FIGS. 7A and 7B show the lower and upper write coils 110 and 112 provided with cooling fins 404 in accordance with embodiments of the disclosure, with current density contours emanating from the ABS 103 near the center of the write coils 110 and 112, A comparison of the current density contours of FIGS. 6A/B and 7A/B reveals relatively little difference there between. The similarity between the current density contours demonstrates that the addition of cooling fins 404 to the lower and upper write coils 110 and 112 has little (e.g. negligible) to no impact on current flow through the write coils 110 and 112.

FIG. 8 shows a conventional upper write coil 604, with temperature contours emanating from the ABS 603 near the center of the write coil 604. FIG. 9 shows the upper write coil 112 provided with cooling fins 404 in accordance with embodiments of the disclosure, with temperature contours emanating from the ABS 103 near the center of the write coil. A comparison of the temperature contours of FIGS. 8 and 9 reveals significantly lower temperatures throughout the write coil 112 provided with cooling fins 404. The temperature contours shown in FIGS. 8 and 9 include 5 different temperature zones, where the temperature is constant within each zone. Each temperature zone is labeled with a letter A through E, with zone A being the hottest zone and E being the coolest zone. Table 1 below provides the temperatures of zones A-E based on a computer modeling experiment.

TABLE 1

| Zone | Temperature (° C.) |
|---|---|
| A | 73.89 |
| B | 67.78 |
| C | 61.67 |
| D | 55.56 |
| E | 49.44 |

A comparison of the temperature contours of FIGS. 8 and 9 reveals that providing cooling fins 404 on the write coil 112 reduced the peak (highest) temperature by about 9.2% (from 73.89° C. to 67.78° C.). In additional to reducing peak and overall coil temperature in the write coil 112, provision of the cooling fins 404 resulted in spreading out the area of each of the temperature zones A-E, indicating a reduced thermal gradient along the breadth and height of the write coil 112.

Figure 10:
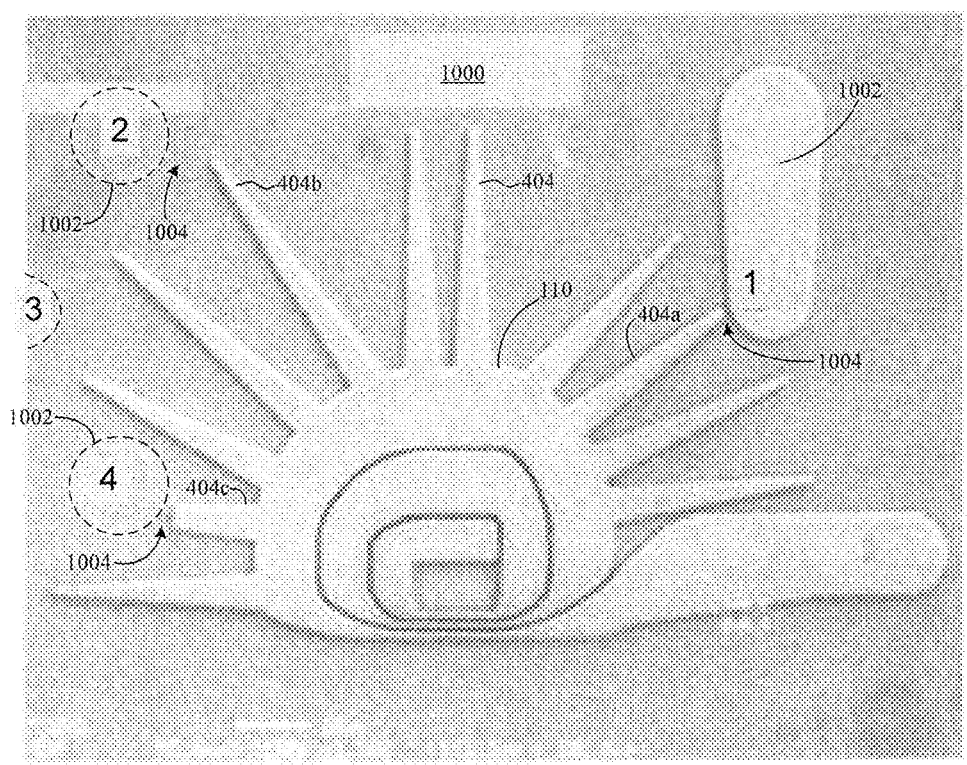
FIG. 10 shows a portion of a slider which includes a lower write coil and a multiplicity of integral cooling tins thermally coupled to, and space apart from, a number of thermally conductive structures of the slider according to embodiments of the disclosure.

FIG. 10 shows a portion of a slider 1000 which includes a lower write coil 110 and a multiplicity of integral cooling tins 404. Also shown on the slider 1000 are a number of thermally conductive structures 1002 in the vicinity of some of the cooling fins 400. The thermally conductive structures 1002 can be any structure or component of the slider that can serve as a heat sink. Vias, for example, are thermally conductive structures formed of various metals that pass through several layers of the slider 1000. Vias are used to electrically connect various components and elements that reside on different layers of the slider 1000. Vias can have a length of up to 20-50 µm, for example, which makes them excellent candidate heat sink structures. Moreover, vias extend through the body of the slider 1000 in a direction perpendicular to the plane of the write coil 110, allowing for a three-dimensional heat dissipation management strategy.

At least some of the cooling fins 404 shown in FIG. 10 are thermally coupled to thermally conductive structures 1002 of the slider. Some of the cooling fins 404 extend to, but are spaced apart from, a thermally conductive structure 1002. For example, the distal tip of cooling fin 404a extends to thermally conductive structure 1002 #1, but is separated therefrom by a gap 1004. Similarly, the distal tip of cooling tin 404b extends to thermally conductive structure 1002 #2, but is separated therefrom by a gap 1004. In the case of cooling fin 404c, this cooling fin has been truncated due to the close proximity of the thermally conductive structure 1002 #4 to the write coil 110. A gap 1004 is provided between the distal tip of cooling fin 404c and the thermally conductive structure 1002 #4.

Figure 11:
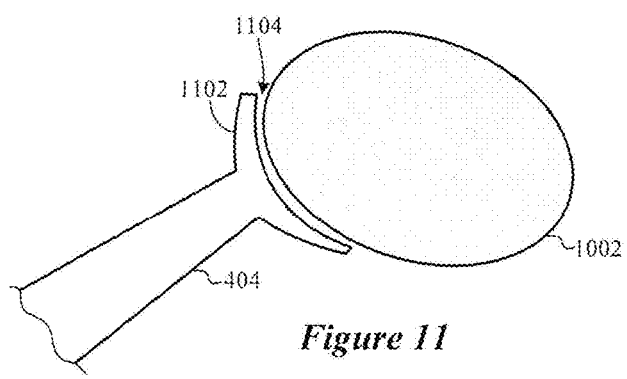
FIG. 11 shows a representative example of a cooling fin having an enlarged distal tip region that is shaped to conform to at least a portion of the adjacent thermally conductive structure according to various embodiments.
Figure 12:
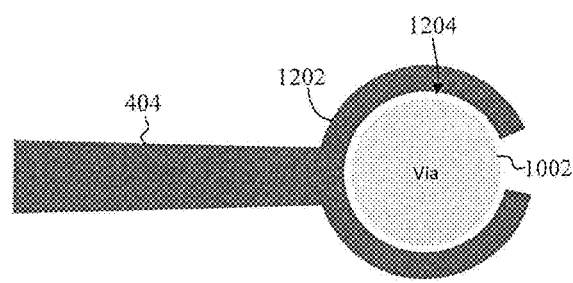
FIG. 12 shows a representative example of a cooling fin having an enlarged distal tip region that is shaped to conform to at least a portion of the adjacent thermally conductive structure according to various embodiments.

In some embodiments, a thermally conductive dielectric material (e.g., MgO, BeO. AlN or diamond) can be disposed between the distal tip of a cooling fin 404 and its associated thermally conductive structure 1002. In other embodiments, one or more of the cooling fins 404 can include an enlarged distal tip region that has a shape that conforms to that of the periphery of an adjacent thermally conductive structure 1002. FIG. 11 shows a representative example of a cooling fin 404 having an enlarged distal tip region 1102 that is shaped to conform to at least a portion of the adjacent thermally conductive structure 1002. A gap 1104 is provided between the enlarged distal tip region 1102 and the thermally conductive structure 1002. In some embodiments, a thermally conductive dielectric material can be disposed between the enlarged distal tip region 1102 of a cooling fin 404 and its associated thermally conductive structure 1002. The enlarged distal tip region 1102 serves to enhance heat dissipation from the cooling fin 404 to the thermally conductive structure 1002. FIG. 12 is similar to the embodiment shown in FIG. 11, but includes a more aggressive heat dissipation interface between the enlarged distal tip region 1202 and the thermally conductive structure 1002. In FIG. 12, the enlarged distal tip region 1202 encompasses most (e.g., >50% or >75%, or >85%) of the periphery of the thermally conductive structure 1002, while maintaining a gap 1204 there between.

FIGS. 13A-13C are representative illustrations of write coils that incorporate an integral cooling fin arrangement according to various embodiments of the disclosure. FIG. 13A shows a lower write coil arrangement 111 comprising a planar lower write coil 110 having a generally circularly-shaped periphery 401. FIG. 13B shows an upper write coil arrangement 113 comprising a planar upper write coil 112 having a generally circularly-shaped periphery 401. In the representative illustration of FIGS. 13A and 13B, each of the lower and upper write coils 110 and 112 has 3 coil turns. FIG. 13C shows the lower and upper write coil arrangements 111 and 113 oriented as they would be when implemented in a recording head.

Each of the lower and upper write coil arrangements 111 and 113 includes a multiplicity of spaced-apart cooling fins 404 connected to and projecting outwardly from the periphery 401 of each of the lower and upper write coils 110 and 112. The cooling fins 404 are shown to have a generally trapezoidal or rectangular shape. In the embodiments shown in FIGS. 13A-13C, the lower write cooling arrangement 111 (FIG. 13A) includes three cooling fins 404a, 404b, and 404c. Various dimensions of the cooling fins 404a, 404b, and 404c are shown in FIG. 13A for illustrative purposes. For example, the cooling fin 404a has a length of about 57 μm, a proximal height of about 8 μm (nearest the lower write coil 110), and a distal height of about 6 μm. The cooling fin 404b has a length of about 38 μm, a proximal height of about 12 μm, and a distal height of about 6 μm. The cooling fin 404c has a length of about 38 μm, a proximal height of about 14 μm, and a distal height of about 7 μm.

Various dimensions of the cooling fins 404d, 404e, and 404f of the upper write coil arrangement 113 are shown in FIG. 13B for illustrative purposes. For example, the cooling tin 404d has a length of about 50 μm, a proximal height of about 15 μm (nearest the upper write coil 112), and a distal height of about 15 μm. The cooling fin 404e has a length of about 32 μm, a proximal height of about 15 μm, and a distal height of about 6 μm. The cooling fin 404f has a length of about 11 μm, a proximal height of about 18 μm, and a distal height of about 10 μm. As was discussed previously, it is understood that the cooling fins 404 shown in FIGS. 13A-13C can have other shapes and sizes, including other geometric and curved (or mixed) shapes. Also, the cooling fins 404 can have dimensions different from those shown in FIGS. 13A-13C, and will generally differ from one head design to another.

As was also discussed previously, the cooling fins 404 are typically formed at the same time and with the same material as their associated lower or upper write coil 110 and 112. As such, the cooling fins 404 can be fabricated using an appropriately designed mask without the need for additional processing steps. In some embodiments, the cooling fins 404 can be formed in a separate processing step(s) using the same or different materials as that used to form the lower or upper write coil 110 and 112.

Systems, devices or methods disclosed herein may include one or more of the features structures, methods; or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising: a slider configured to interact with a magnetic recording medium and comprising an air bearing surface (ABS); a writer provided on the slider and comprising: a write pole terminating at or near the ABS; a return pole proximate the write pole; and a write coil arrangement provided around the write pole and comprising: lower and upper write coils each having a generally circularly-shaped periphery; and a plurality of spaced-apart cooling fins connected to and projecting outwardly from the periphery of each of the lower and upper write coils; wherein: the periphery of each of the lower and upper write coil defines an arc originating at a first location of the ABS and terminating at a second location of the ABS: the cooling fins are distributed along the arc; and the cooling fins are configured to conduct negligible or no current when the write coil arrangement is energized.

2. The apparatus of claim 1, wherein the cooling fins are formed from the same material used to form the lower and upper write coils.

3. The apparatus of claim 1, wherein at least some of the cooling fins have a length along a longitudinal axis of the cooling fins ranging between about 40 and 90 μm.

4. The apparatus of claim 1, wherein the cooling fins have a generally trapezoidal shape.

5. The apparatus of claim 1, wherein:
the cooling fins have a proximal end adjacent the write coil periphery and a distal terminal end;
the proximal end has a height ranging between about 4 and 18 μm; and
the distal terminal end has a height ranging between about 2 and 15 μm.

6. The apparatus of claim 1, wherein at least some of the cooling fins of the lower and upper write coils are radially staggered from another.

7. The apparatus of claim 1, wherein:
the slider comprises a plurality of thermally conductive structures spaced apart from the lower and upper write coils; and
at least some of the plurality of cooling fins are thermally coupled to the thermally conductive structures.

8. The apparatus of claim 1, wherein:
the slider comprises a plurality of thermally conductive structures spaced apart from the lower and upper write coils; and
at least some of the plurality of cooling fins extend from the write coil periphery to a location of the slider adjacent to, but spaced apart from, the thermally conductive structures.

9. The apparatus of claim 8, wherein the plurality of thermally conductive structures comprises metallic vias that extend at least partially through the slider.

10. The apparatus of claim 8, wherein the at least some of the plurality of cooling fins comprise an enlarged distal tip region that conforms in shape to that of a periphery of the thermally conductive structures.

11. The apparatus of claim 10, further comprising a thermally conductive dielectric material between a distal tip of the at least some of the plurality of cooling fins and the thermally conductive structures.

12. The apparatus of claim 1, further comprising:
a near-field transducer provided on the slider proximate the write pole and the ABS; and
an optical waveguide provided on the slider proximate the near-field transducer.

13. An apparatus, comprising: a slider configured to interact with a magnetic recording medium, the slider comprising an air bearing surface (ABS) and a plurality of thermally conductive structures; a writer provided on the slider and comprising: a write pole terminating at or near the ABS; a return pole proximate the write pole; and a write coil arrangement provided around the write pole and comprising: lower and upper write coils each having a generally circularly-shaped periphery; and a plurality of spaced-apart cooling fins connected to and projecting outwardly from the periphery of each of the lower and upper write coils; wherein at least some of the plurality of cooling fins are thermally coupled to the thermally conductive structures; and wherein the periphery of each of the lower and upper write coil defines an arc originating at a first location of the ABS and terminating at a second location of the ABS, the cooling fins are distributed along the arc, and the cooling fins are configured to conduct negligible or no current when the write coil arrangement is energized.

14. The apparatus of claim 13, wherein the write coil arrangement is a planar write coil arrangement.

15. The apparatus of claim 13, wherein the write coil arrangement is a helical write coil arrangement.

16. The apparatus of claim 13, wherein that at least some of the plurality of cooling fins extend from the write coil periphery to a location of the slider adjacent to, but spaced apart from, the thermally conductive structures.

17. The apparatus of claim 13, wherein the plurality of thermally conductive structures comprise metallic vias that extend through the slider.

18. The apparatus of claim 13, wherein the at least some of the plurality of cooling fins comprise an enlarged distal tip region that conforms in shape to that of a periphery of the thermally conductive structures.

19. The apparatus of claim 13, further comprising a thermally conductive dielectric material between a distal tip of the at least some of the plurality of cooling fins and the thermally conductive structures.

20. The apparatus of claim 13, further comprising:
a near-field transducer provided on the slider proximate the write pole and the ABS; and
an optical waveguide provided on the slider proximate the near-field transducer.

\* \* \* \* \*